Aug. 27, 1957  R. R. FLORAC  2,804,507
PAGING MACHINE

Filed June 1, 1953  9 Sheets-Sheet 1

INVENTOR
RICHARD R. FLORAC,
BY
ATTORNEY

Aug. 27, 1957   R. R. FLORAC   2,804,507
PAGING MACHINE

Filed June 1, 1953   9 Sheets-Sheet 2

INVENTOR
RICHARD R. FLORAC,

BY Robert B. Pearson
ATTORNEY

Aug. 27, 1957 R. R. FLORAC 2,804,507
PAGING MACHINE
Filed June 1, 1953 9 Sheets-Sheet 3

INVENTOR
RICHARD R. FLORAC,
BY Robert B Larson
ATTORNEY

Aug. 27, 1957 — R. R. FLORAC — 2,804,507
PAGING MACHINE

Filed June 1, 1953 — 9 Sheets-Sheet 4

INVENTOR
RICHARD R. FLORAC,

ATTORNEY

Aug. 27, 1957 R. R. FLORAC 2,804,507
PAGING MACHINE
Filed June 1, 1953 9 Sheets-Sheet 7

INVENTOR
RICHARD R. FLORAC,
BY Robert B Pearson
ATTORNEY

Aug. 27, 1957  R. R. FLORAC  2,804,507
PAGING MACHINE

Filed June 1, 1953  9 Sheets-Sheet 8

INVENTOR
RICHARD R. FLORAC,

BY *Robert B. Pearson*
ATTORNEY

Aug. 27, 1957 R. R. FLORAC 2,804,507
PAGING MACHINE

Filed June 1, 1953 9 Sheets-Sheet 9

INVENTOR
RICHARD R. FLORAC,

BY Robert B. Larson
ATTORNEY

United States Patent Office 2,804,507
Patented Aug. 27, 1957

2,804,507

PAGING MACHINE

Richard R. Florac, New York, N. Y., assignor to Aircall, Inc., New York, N. Y., a corporation of Delaware Application June 1, 1953, Serial No. 358,796

7 Claims. (Cl. 179—100.2)

This invention relates to a paging machine and more particularly is an improvement in machines of the type described in the co-pending application of Walter Robert Hicks, Serial No. 254,115 filed October 31, 1951, for use in radiopaging.

Briefly, the radiopaging service consists of broadcasting a series of signals, preferably numbers, each number corresponding to a specific subscriber. These numbers are broadcast only when a telephone call has come in for the subscriber and the purpose is to advise the subscriber by radio that there is a call for him.

It has not been found feasible to have an operator repeatedly calling the numbers into the broadcasting system, the primary objection being that an operator cannot continuously repeat the numbers uniformly over long periods of time.

Therefore, the object of the present invention is to provide a machine which will continuously repeat the numbers of subscribers with clarity and substantial uniformity of tone, volume, etc.

A number of problems arise in the design of such a machine. For example, the placing of these signals on the machine and the removing of the signals from the machine should be done as easily as possible and preferably without interrupting the operation of the machine. Further, where the signals are to be numbers as discussed above, it has been found desirable to have the numbers broadcast in their numerical sequence so that it is easier for the subscriber to distinguish his number from the rest.

Because the number of signals being transmitted during peak load differs quite substantially from the number of signals being transmitted at minimum load, it is important to provide an arrangement whereby the complete cycle of signals at the time of minimum load can be of shorter duration than the complete cycle of signals at peak load.

The present invention provides a solution to these and other problems and consists of a turntable having at least one circular groove in the plane of the turntable and a plurality of slides each having a specific signal magnetically recorded thereon and adapted to be held in the circular groove. A magnetic pickup head is mounted alongside of the turntable and cooperates with the slides to pick up the magnetic signal recorded on the slides for broadcasting.

For varying the duration of the cycle of operation, alternative arrangements can be used. In one arrangement, two concentric grooves can be used in combination with a variable speed motor driving the turntable. At peak load, the outer circle can be used and the turntable is driven at a slow speed. When the load drops off, the slides can be transferred to the inner groove and the turntable driven at a R. P. M. such that the linear velocity of the slides with respect to the magnetic head remains the same.

The preferred embodiment, however, is a simple, but nevertheless ingenious solution to the problem. The solution consists only in using the large diameter groove in the turntable and, during the low load period, employing two or more slides for every signal to be transmitted. One group of slides is placed in one segment of the circle and the other group of slides is placed in another segment of the circle.

The use of the turntable creates other problems which are solved by the present invention. To handle fifty signals, for example, during peak load, the slides must be small and the turntable driven very slowly in order to keep the machine down to a reasonable size. The machine cannot be driven too slowly because, as the speed of the slides with respect to the magnetic head is reduced, the fidelity of the signal is also diminished. Further, the slides must be made large enough to permit the recording thereon of the desired signal.

In known magnetic tape and wire recorders, the tracking of the magnetic strip through the sound head is a fairly simple procedure since the strip is continuous and moves in a linear path. However, in the present invention, where separate segments are used, the magnetic material is broken and moves in a circular path. Thus, the relationship of the magnetic head to the slides is of utmost importance. If the slides and the manner of suspending the magnetic head are not properly designed, the tracking of the head with respect to the slides will be unsatisfactory with the result that reproduction will be poor, and the wear of the magnetic material in the slides will be excessive.

It is the object of the present invention to provide an automatic radiopaging machine which performs satisfactorily and provides solutions to the problems discussed above.

It is another object of this invention to provide a paging machine of simple design and construction which consists of a slowly driven turntable, magnetic slides mounted in a circle on said turntable, and a magnetic head associated with said slides.

It is a further object of this invention to mount the magnetic head resiliently and on a universally adjustable support.

It is still a further object of this invention to supply means for preventing substantial variation in the speed of the turntable during reproduction.

It is another object of the invention to provide a design for a slide which is easy to insert and remove from the turntable and which has mounted thereon a magnetic strip which will have good wearing characteristics.

These and other objects will become apparent from the description of the invention in conjunction with the accompanying drawings in which:

Fig. 30 is a perspective view of the machine with a cover attached.

Figure 1:
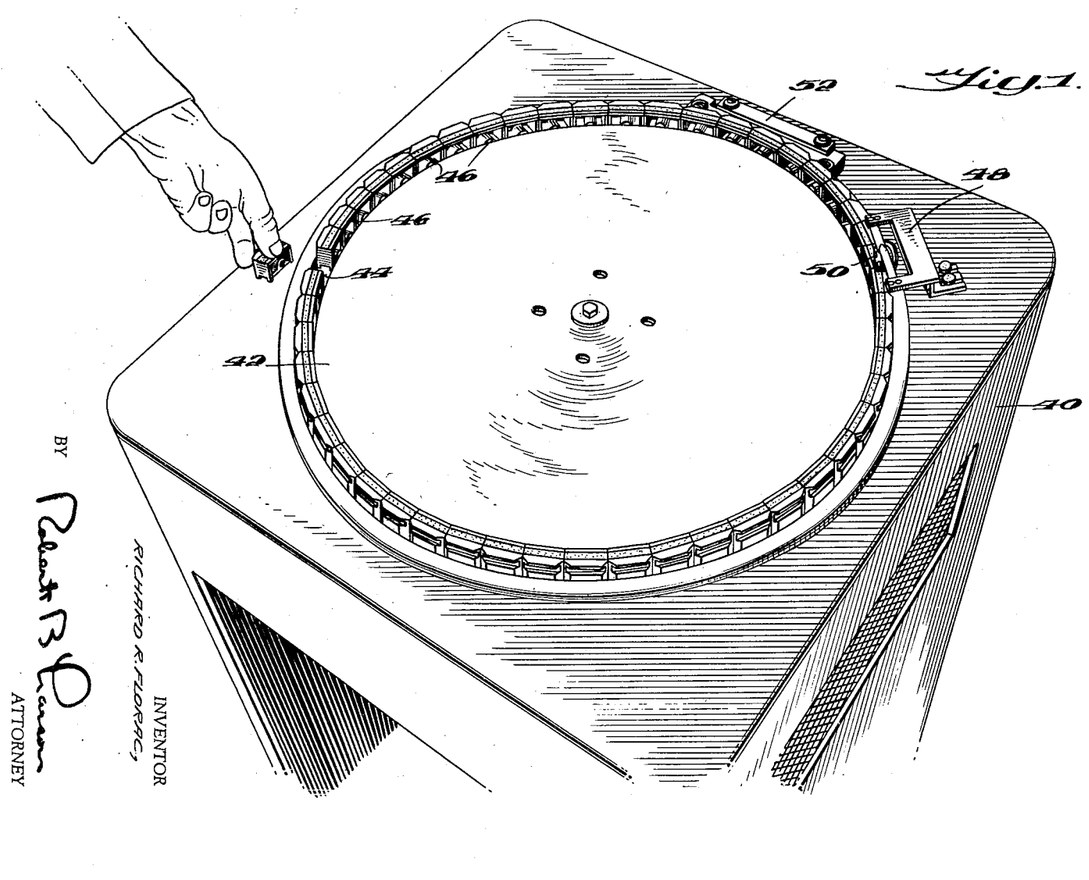
Fig. 1 is a perspective view of the preferred embodiment of the invention.
Figures 7, 10:
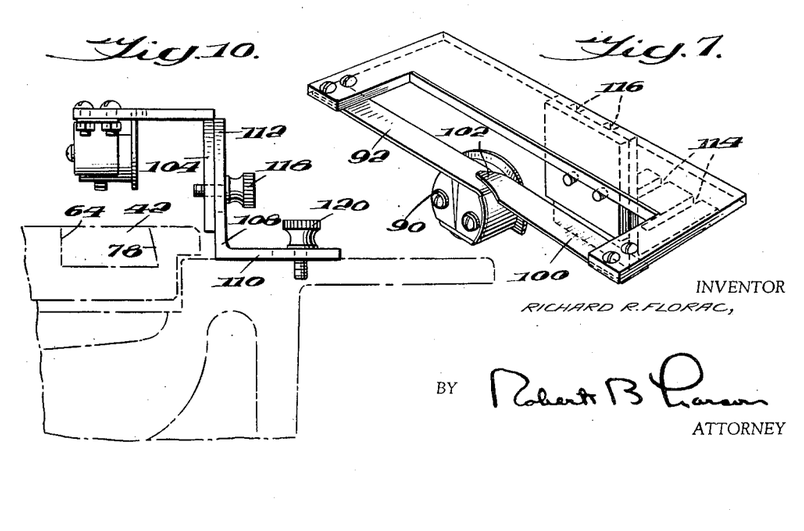
Fig. 7 is a perspective view of the magnetic head and its support.
Fig. 10 is a side elevational view thereof.
Figure 8:
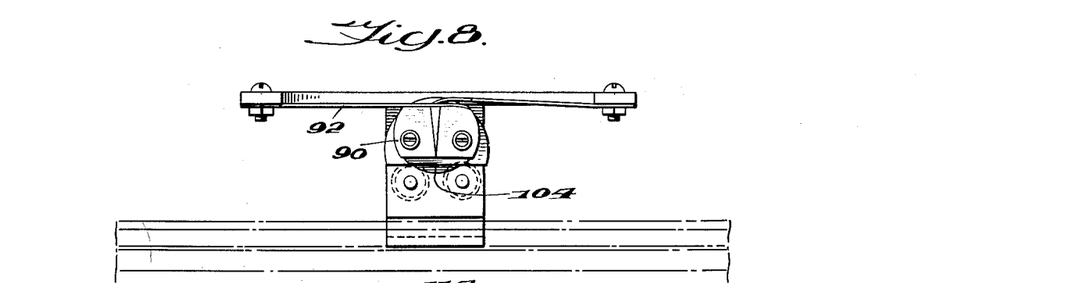
Fig. 8 is a front elevational view thereof.
Figure 9:
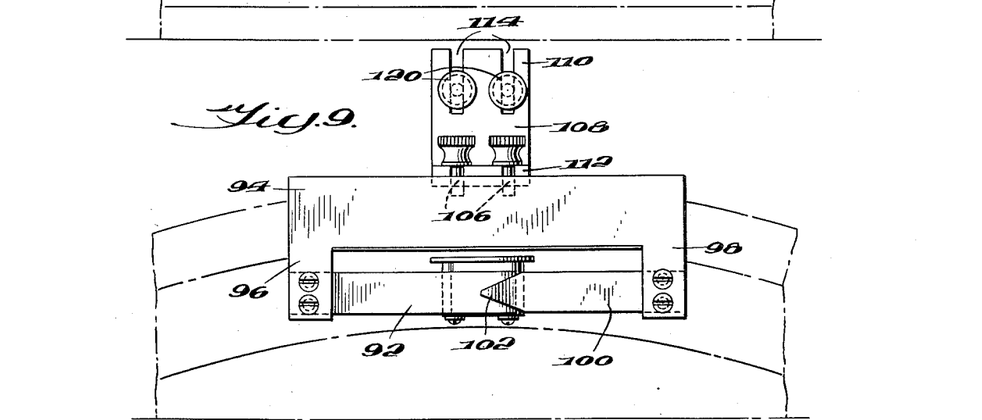
Fig. 9 is a top plan view thereof.
Figure 11:
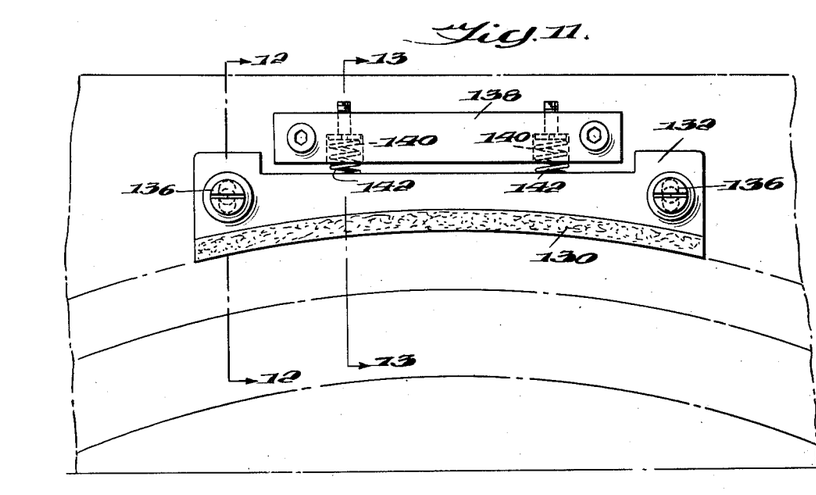
Fig. 11 is a fragmentary top plan view of the invention showing the brake assembly.
Figures 12, 13, 14:
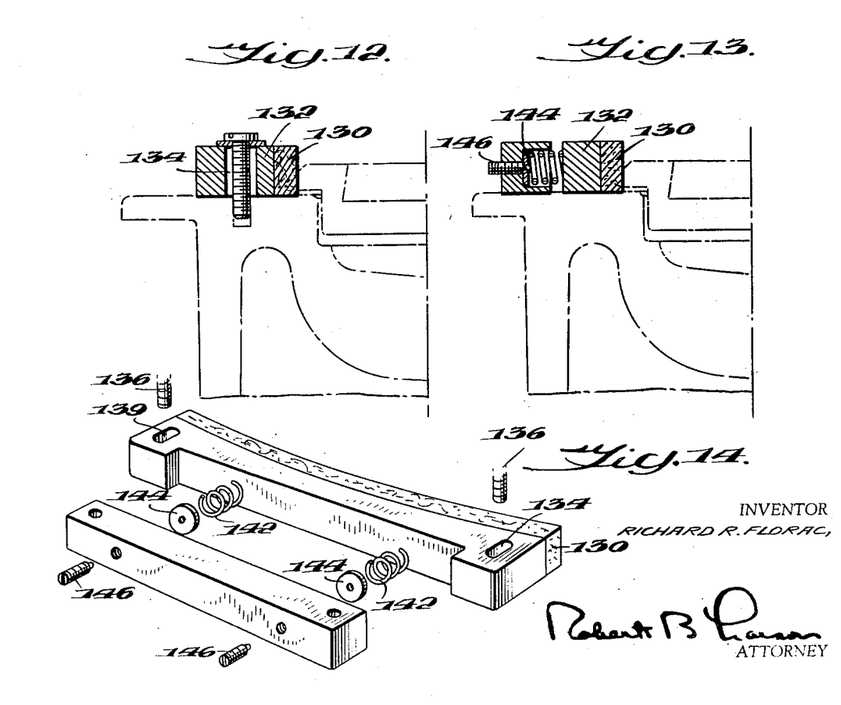
Fig. 12 is a sectional view taken along lines 12—12 of Fig. 11.
Fig. 13 is a sectional view taken along lines 13—13 of Fig. 11.
Fig. 14 is an exploded view in perspective of the brake assembly.

Referring now to Fig. 1 of the drawings, the machine comprises a cabinet 40 which houses a constant speed motor and driving connections (not shown) which drives a turntable 42. The turntable is approximately 24 inches in diameter and spaced ½ inch from the edge thereof is a groove 44. The groove 44 is trapezoidal in section as shown in Fig. 10 in order to accommodate slides 46 disposed in the grooves. The slides are 1¼ inches long and are carried by the turntable at a linear speed of ¾ or ⅞ inch per second. The slides are designed as described below so that they can be easily inserted and removed from groove 44 and can be slid along the circumference of the groove.

The size of the turntable and the slides and the speed of rotation of the turntable are of particular importance. Substantially invariable is the time required to record or reproduce one unit of intelligence. The shortest practical message for radiopaging is three numbers which require about one second for recording. Therefore, each slide must be exposed to the magnetic head for slightly more than one second so that there will be intervals of silence between signals.

Manufacturers of tape recorders state that the tape should move past the recorder a minimum of 1⅞ inches per second. The inventor, however, has produced satisfactory results with a speed of ¾ to ⅞ inch per second, although this slower speed increases the criticality of adjustment of the tracking of the head with respect to the slides. It should also be noted that the slowest speed possible is desirable in order to decrease the wear on the slides and to facilitate the handling of the slides without interrupting the operation of the turntable. The low speed and small size of the slides is obviously necessary in order to keep the size of the turntable to a reasonable size.

A magnetic head assembly 48 is mounted on the cabinet so that the head itself 50 engages the upper surface of the slides 46. A braking arrangement 52 is mounted on the cabinet 40 and is arranged to apply a slight pressure on the peripheral surface of the turntable so as to eliminate any variance in turntable speed caused by looseness in the connections between the drive motor and the turntable.

*The magnetic slides*

The magnetic slides are shown in Figs. 2 through 6. The slide is preferably made of plastic and the magnetic material 54 is Hycar, an impregnated magnetic rubber. This material is particularly satisfactory from the standpoint of its wearing characteristics. The resiliency of the rubber which is about ⅛ of an inch thick serves as a cushion to the action of the magnetic head.

Figure 2:
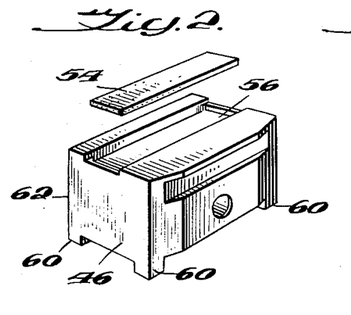
Figs. 2 and 2a are perspective exploded views of the magnetic slide.
Figure 2A:
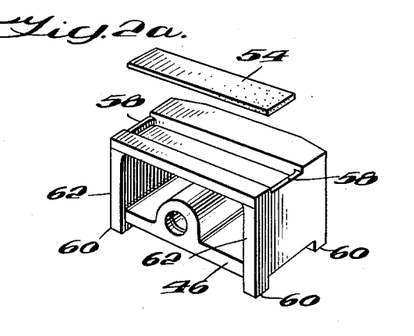
Figure 3:
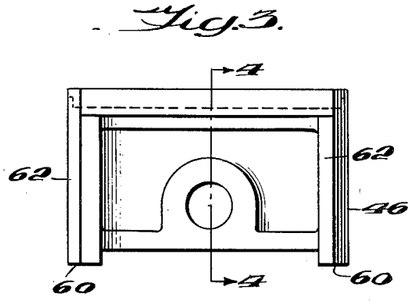
Fig. 3 is a rear elevational view thereof.
Figure 4:
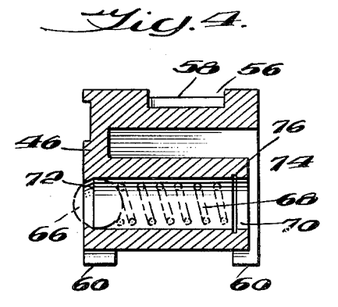
Fig. 4 is a sectional view taken along lines 4—4 of Fig. 3.
Figure 5:
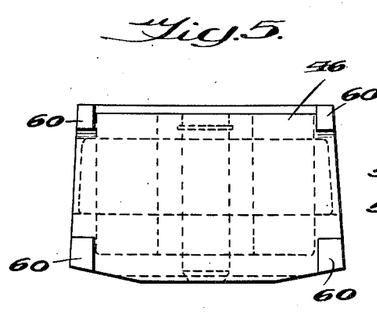
Fig. 5 is a bottom view of the slide.
Figure 6:
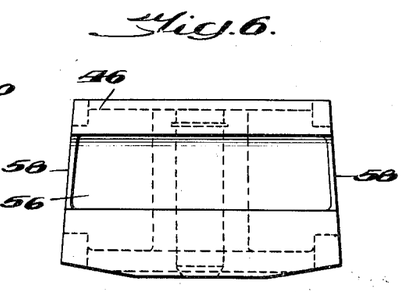
Fig. 6 is a top plan view thereof.

The slide has a groove 56 into which the magnetic rubber element 54 is inserted. The groove is terminated at each end by walls 58 which serve to locate the magnetic element 54 in the groove. When the magnetic element 54 is seated in the groove, its surface extends above the end walls 58 so that the end walls do not interfer with the movement of the magnetic head from one slide to the next adjacent slide.

When seated in the groove, the slide rests on four legs 60. The upper extensions 62 of the legs 60 on one side of the slide engage the vertical wall 64 (Fig. 10) of the groove. The surfaces 62 are held against the wall 64 by the action of a ball 66 and spring 68 located inside a cylindrical passageway 70 in each slide. The ball 66 is prevented from being forced out of the passageway 70 by frusto-conical wall 72. The spring is retained in the passageway at one end by the ball and at the other end by any suitable clip 74 located in annular groove 76.

The ball engages the inclined wall 78 of the groove (Fig. 10) forcing surfaces 62 against the vertical wall 64, thus holding the slide in position by a sort of three-point suspension, that is, the contact with the two surfaces 62 and the ball 66.

*Magnetic head suspension*

One of the more difficult problems in connection with the present invention involves the mounting of the magnetic head. As indicated above, the slow speed of revolution and the nature of the track formed by the slides require a criticality of adjustment and suspension of the head. It is important that the gap in the magnetic head can be angularly adjusted for optimum position with respect to the magnetic slides; that it will engage the slides with the desired pressure; and that it will be substantially unaffected by the irregularities in the track formed by the magnetic slides. A solution to the problem is found in the head suspension arrangement shown in Figs. 7 through 10.

The magnetic head 90 (shown without its electrical connections) is fixedly mounted to a strip of spring steel 92. The spring steel is connected at an end remote from the magnetic head to a plate 94 having arms 96 and 98. The steel strip 92 is connected to one arm 96 and a second strip of spring steel 100 is attached at one end to the arm 98 of plate 94.

The other end 102 of the spring member 100 is tapered to a point which slidably engages the first spring member 92 at a point which is immediately above the gap 104 in the magnetic head.

The advantage of this construction is as follows: The spring suspension of the magnetic head is necessary in order to provide a substantially uniform pressure of the head against the magnetic slides. In other words, the magnetic head cannot be rigidly mounted with respect to the slides. The force of the spring must be great enough to provide the proper pressure of the magnetic head against the magnetic slides in order to provide adequate reproduction. Balanced against this consideration, however, is the requirement that the spring be flexible or resilient enough not to resist too greatly the small angular movement which the head must have in order to follow the irregularities in the track provided by the magnetic slides. Thus, adequate pressure could be supplied by utilizing a heavier spring 92 but this would sacrifice the flexibility of angular movement. Conversely, the small angular movement could be provided by utilizing a thinner spring 92 but with the consequent loss of the desired pressure of the magnetic head against the slides.

This solution which has been provided by this invention is the use of a thin spring 92 and a supplementary spring 100 to provide the additional pressure. The supplementary spring engages the main spring 92 at a single point above the gap in the magnetic head, in sliding engagement, so as not to resist the small movement required in the magnetic head during tracking. Thus, the pointed spring 100 exerts a controllable pressure on the magnetic head and spring 92, allowing the head to move up, down, and side to side, and further it helps to dampen any resonance or vibrations that the flat spring 92 might develop during operation.

The plate 94 is provided with a flange 104 having two threaded holes 106. Cooperating with this flange 104 is an L-shaped member 108 having leg 110 mounted on the cabinet and leg 112 to be fastened to flange 104. Each leg 110 and 112 is provided with two slots 114 and 116 respectively. Bolts 118 are threaded to engage the holes 106 to clamp leg 112 against flange 104. Bolts 120 have a threaded engagement with the cabinet. The width of the slots 114 and 116 is slightly greater than the outside diameter of the bolts 120 and 118 respectively so that the leg 110 is permitted angular movement with respect to the cabinet and the flange 104 is permitted angular movement with respect to the leg 112.

With this construction, the magnetic head can be moved universally in a plurality of different directions in order to locate it with respect to the track formed by the slides for optimum reproduction. The first adjustment is to loosen bolts 120 and move the assembly relative to the cabinet toward the groove 44 until the gap in the magnetic head is over the center of the track formed by the elements 54.

The plate and magnetic head is moved downwardly by loosening bolts 118 until the gap in the magnetic head engages one of the slides at the desired pressure.

The assembly is then rotated with respect to the cabinet in a horizontal plane so that the gap in the magnetic head is at an azimuth angle which is 90° to a tangent to the groove at the location of the gap.

The final adjustment is the rotation of the magnetic head in a vertical plane so that the center of the gap engages the slide properly.

It is to be noted that the recording of the signals on the slides can be done on the turntable as shown. However, it has been found to be desirable, for recording, to use a larger magnetic head, that is, one which records a larger magnetic track, and then to use a smaller head for the reproduction. Thus, slight angular movements of the reproducing head with respect to the magnetic track are not so critical since, even with slight variations, the reproducing head will always stay within the larger recorded track. Further, the narrower head is better adapted to follow the unevenness which is inherent in a track formed by slides of the type described.

*Brake mechanism*

It was pointed out above that the tracking speed of the turntable is extremely slow, approximately ¾ of an inch per second. With a 24-inch turntable, there is approximately ⅔ revolution per minute. It is obvious that, in the reduction gearing and connections between the motor and turntable required to bring the speed of the turntable down to ⅔ revolution per minute, there will be a certain inherent amount of play or looseness. It should also be apparent that, because of the extremely low linear speed, any variation in the linear speed will greatly affect the quality of reproduction.

Accordingly, it is found desirable to provide a braking mechanism to eliminate any looseness or play in the turntable. The function of the braking mechanism is, of course, not to reduce the speed of the turntable, but to keep the turntable at a constant speed.

The braking mechanism is shown in Figs. 11 to 14. It consists of a leather brake lining 130 mounted on a shoe 132. The shoe 132 has two holes 134 of oval section through which pass two bolts 136. The bolts are threaded to engage the cabinet to hold the shoe in position. The oval section holes 134 permit the support 130 to be moved relatively to the cabinet.

Adjacent the shoe 132 is a bar 138 having two holes therein 140 and springs 142 located in the holes and engaging the shoe 132 to force it against the turntable 42. The other ends of the springs, seated in the holes 140, engage washers 144. The washers are moved outwardly by rotation of set screws 146 which are threaded into the bar 138.

The bolts 136 locate the shoe 132 in its approximate position with respect to the turntable. By turning the set screws 146, the pressure of the springs 142 can be varied so as to force the brake lining 130 against the turntable, thus applying the desired amount of drag on the rotation of the turntable.

*Alternative embodiment of the invention*

Figure 15:
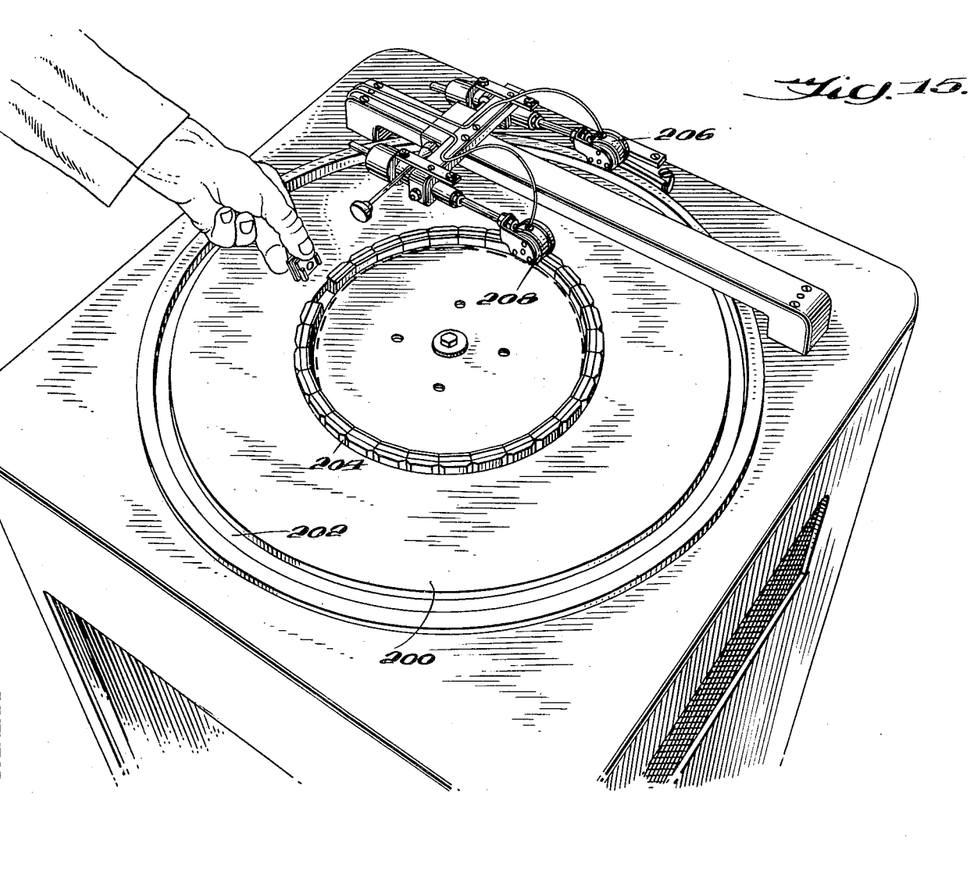
Fig. 15 is a perspective view of another embodiment of the invention.

Fig. 15 shows an alternative embodiment of the invention, the most important distinguishing feature being that the turntable 200 has two grooves 202 and 204. The outside groove 202 is approximately twice the diameter of the inside groove 204. The outside groove is used during peak load, whereas the inside groove is used during periods of light load on the system.

The magnetic heads 206 and 208 cooperate with the outside and inside grooves respectively. These heads are symmetrically mounted on a bridge 210 through a cross bar 212 and pivotally mounted arms 214 and 216. Each arm is provided with a movable counter balance 218 so as to adjust the weight or pressure of the head on the magnetic slides.

Figure 17:
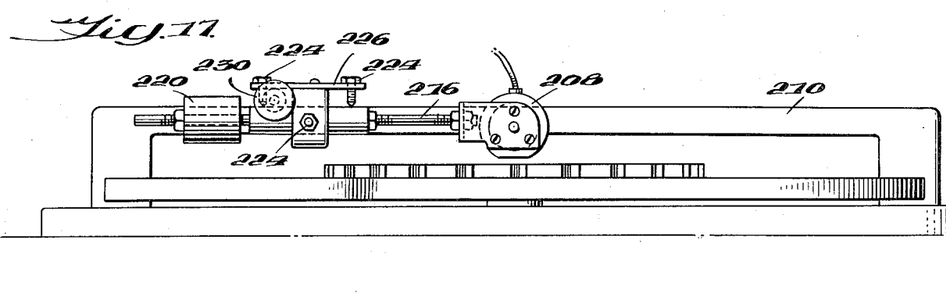
Fig. 17 is a side elevational view thereof.
Figure 18:
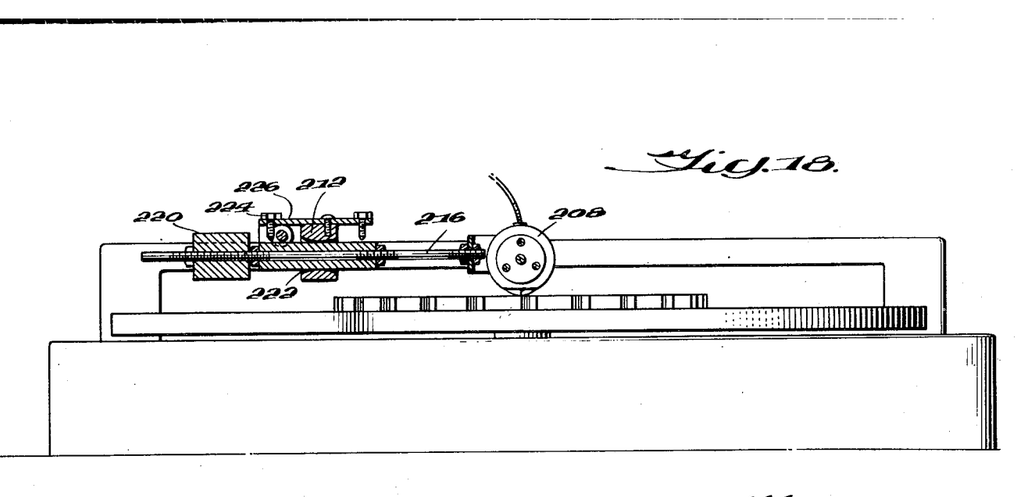
Fig. 18 is a sectional view taken along lines 18—18 of Fig. 16.

On each side of cross arm 212 is a hole 222 (Fig. 18) through which the arm 214 or 216 passes. The hole is large enough to permit the arm 214 to pivot therein and the arm is pivotally mounted in the hole by a bolt 224. (See Fig. 17.) The pivotal movement of each arm is limited by set screws 224 mounted on a bar 226 above each arm.

The magnetic heads and associated arms are adjusted so that, when one head is in engagement with the magnetic slides, the other head is out of engagement. This is accomplished by a mechanical shift bar 230 (see particularly Fig. 19). The bar consists of a rod 232, two frusto-conical surfaces 234, each of said surfaces being terminated by a cylindrical surface 236. The bar is slidably mounted in a tube 238 which is fixedly mounted to bridge 210.

Figure 19:
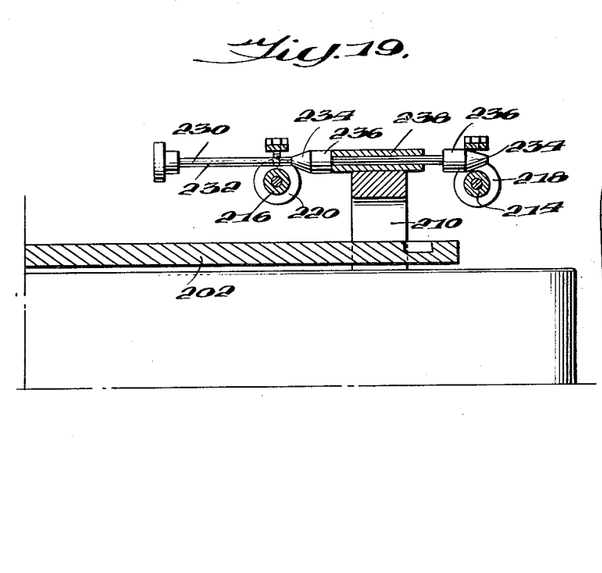
Fig. 19 is a sectional view taken along lines 19—19 of Fig. 16.
Figure 20:
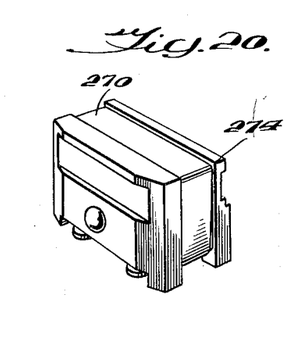
Figs. 20 and 21 are perspective views of alternative embodiments of the magnetic slide.
Figure 21:
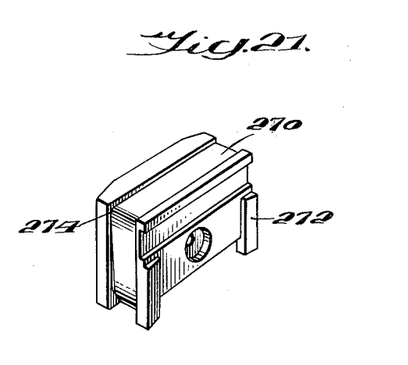

As viewed in Fig. 19, when the rod is pushed to the right into the position shown, a frusto-conical surface 234 engages arm 214 forcing it downwardly, thus causing the arm to rotate to raise the magnetic head 206. At the same time, the weight of the magnetic head on the arm 208 causes it to pivot following the other frusto-conical surface 234, thus lowering the magnetic head 208 into operating engagement with the slides in the inner circle.

When the rod 230 moves toward the left, the reverse action takes place.

It is to be understood that this arrangement has applications other than with magnetic slides, for example, two continuous circular tracks could be used and a string of messages recorded on one, while reproduction and broadcast is taking place on the other. Only a slight adjustment of the mechanism would be required for such an operation.

Figure 16:
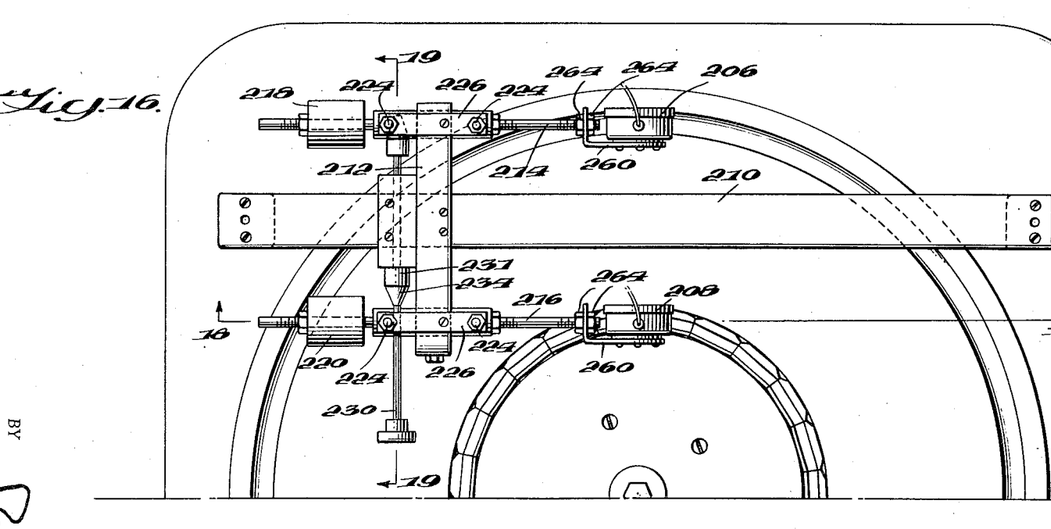
Fig. 16 is a top plan view of one-half of the turntable and magnetic head assembly.
Figure 27:
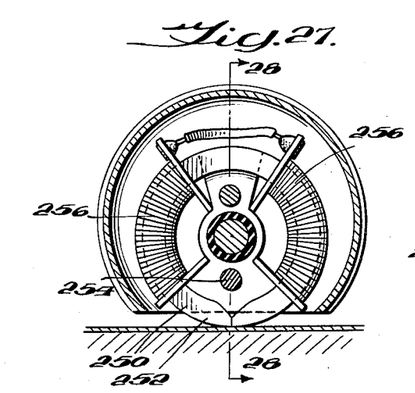
Fig. 27 is a sectional view taken along lines 27—27 of Fig. 28.
Figure 28:
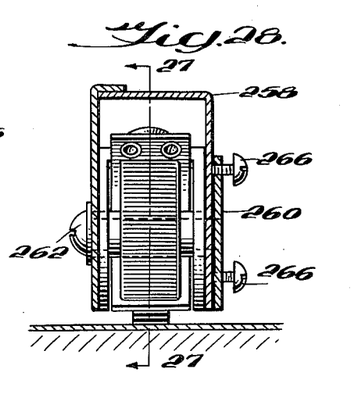
Fig. 28 is a sectional view taken along lines 28—28 of Fig. 27.
Figure 29:
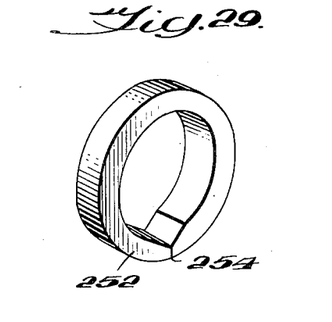
Fig. 29 is a perspective view of the magnetic core in the head assembly.

The magnetic head used in this embodiment is shown in Figs. 27 to 29. The magnetic head proper 250 comprises a core 252 having a gap 254 and the usual coils 256. The head is fixedly mounted in a housing 258 which is, in turn, pivotally mounted to an L-shaped member 260 (see Fig. 16) by a bolt 262. The L-shaped member 260 is pivotally mounted to an arm 214 or 216 and held in position by nuts 264.

Set screws 266 are threaded into the L-shaped member 260 and, by adjustment of the set screws 226, the magnetic head can be angularly adjusted relative to the support 260 and consequently relatively to the slides.

Thus, in this embodiment, the pressure of the head on the slides can be regulated by movement of the counter weight associated with the head. Vertical adjustment of the magnetic head can be effected by rotating the support 260 around its pivot on the arm 214 or 216. Fine universal angular adjustment can then be effected by the set screws 266.

The design of the slides in this embodiment is slightly different from the design in the preferred embodiment. The important difference is that, instead of using magnetic impregnated rubber as is done in the preferred embodiment, a magnetic tape 270 is wrapped around the slide 272 in a groove 274 provided for that purpose. The two ends of the tape are secured to the bottom of the slide by a clamp 276 held in position by bolts 278.

Figures 22, 25:
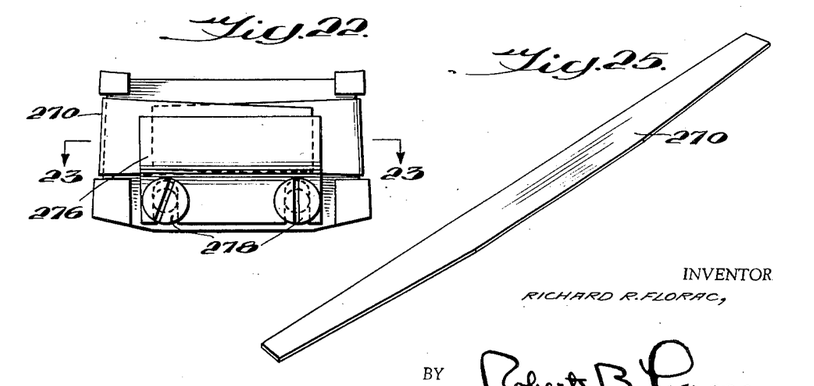
Fig. 22 is a bottom view thereof.
Fig. 25 is a perspective view of the magnetic tape applied to the slide.
Figure 23:
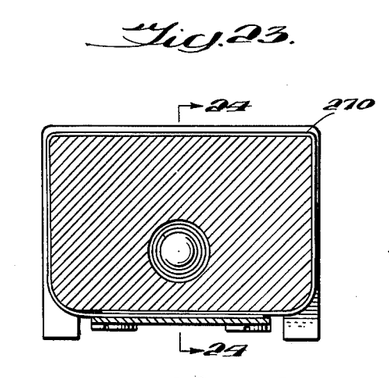
Fig. 23 is a sectional view taken along lines 23—23 of Fig. 22.
Figure 24:
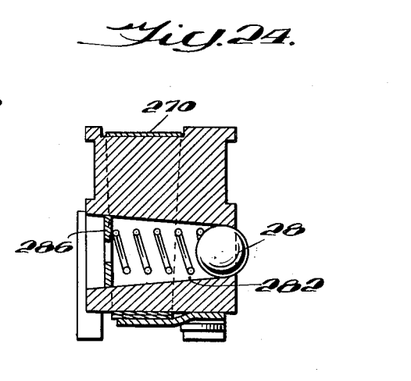
Fig. 24 is a sectional view taken along lines 24—24 of Fig. 23.
Figure 26:
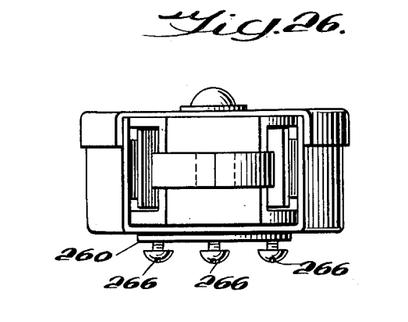
Fig. 26 is a bottom view of a magnetic head used with the machine shown in Fig. 15.

The slide is held in the groove in substantially the same manner as the slide discussed above. The slide of this embodiment also utilizes a ball 280 located in a frusto-conical passageway 282 and held in that passageway by a spring 284 and washer 286.

The braking mechanism in this embodiment is identical to the braking mechanism in the preferred embodiment.

In both embodiments, it may be found desirable to house the turntable in a cabinet such as that shown in Fig. 30 having a cover 290 with a door 292 hinged to the cover at 294.

The drive for the embodiment shown in Fig. 15 et seq. must provide two speeds. If the diameter of the groove 202 is twice the diameter of the groove 204, then the speed of the turntable, when the groove 204 is used for the reproduction, must be twice the revolutions per minute as when the groove 202 is used for the reproduction in order to provide the same linear speed of the slides with respect to the magnetic heads.

*Operation of the invention*

The operation of the invention is as follows: The magnetic head is adjusted as described above so that the head will engage the track formed by the magnetic members on the slide for optimum reproduction. The brake is adjusted so that the desired amount of drag is placed on the turntable. The machine is now ready for operation. Before the first call for the subscriber comes in, it may be found desirable to fill the turntable groove with "dummy" slides having signals for which there is no subscriber. Thus, the machine will continuously broadcast numbers so that there are no long silences in the broadcast. There should be reserved five dummy numbers for every one hundred numbers issued to subscribers and these dummy numbers should be placed on the wheel in numerical order, for example, 101, 121, 141, etc.

When a telephone call comes in for a subscriber, the operator will take a slide corresponding to his signal number and substitute that slide in the wheel in place of one of the dummy numbers. This operation will be performed for each call that comes in for subscribers. When a subscriber telephones in to obtain the additional information regarding the call which he has received, his slide will be removed from the turntable and a dummy slide inserted in its place.

Because the machine revolves at such a low speed, the changes referred to above can be made without interrupting the broadcast of the signals.

Because all of the numbers are placed in the groove in numerical order, the subscriber can listen rather casually to the numbers until they start to approach his particular signal. At that point, he can listen more attentively, and he will know that no call has come in for him as soon as the broadcast has gone past his particular number.

It is realized that many changes can be made in the invention described above, and it is to be understood that the invention is not to be limited except by the scope of the accompanying claims.

I claim:

1. A paging machine comprising, a frame, a turntable mounted on said frame for rotation about an axis, and having at least one circular groove with said axis as its center, a plurality of individual elements having signals recorded thereon and removably and slidably mounted in said groove, a reproducing head mounted on said frame adjacent said groove for reproducing the signals on said elements as said turntable is rotated.

2. A paging machine according to claim 1 in which a plurality of slides are located in separate segments of said groove, each group of slides being identical with every other group of slides, whereby more than one cycle of signals can be reproduced for each revolution of said turntable.

3. A paging machine comprising a frame, a turntable mounted on said frame for rotation about an axis and having at least one circular groove in the upper surface thereof having said axis as its center, a plurality of individual elements removably and slidably mounted in said groove, a segment of magnetic material mounted on the surface of each of said elements and having a signal recorded thereon, a magnetic head mounted on said frame and engageable with said material, whereby as said turntable is rotated, said magnetic head picks up the signal consecutively from said elements.

4. A paging machine comprising a frame, a turntable rotatably mounted on said frame, a circular groove around the marginal portion of the upper surface of said turntable, a motor connected to drive said turntable at a speed in which said groove has a linear speed of less than one inch per second, a brake mechanism mounted on said frame and engaging said turntable to provide a drag on said turntable, a plurality of slides disposed in said groove and having signals magnetically recorded thereon, and a magnetic sound head suspended above said groove to cooperate with said slides for reproducing the recorded signals.

5. A paging machine according to claim 4 in which said braking mechanism comprises a brake lining engaging said turntable, a shoe supporting said lining, means mounting said shoe to said frame for movement with respect thereto, spring means connected to said frame and engaging said shoe, and means for presetting the pressure of said spring means.

6. A sound reproducing machine comprising, a frame; a turntable mounted for rotation on said frame; a circular groove formed in the marginal portion of the upper surface of said turntable; a plurality of slides disposed in said groove and having magnetic signals recorded thereon to form a circular magnetic track; a magnetic sound head engaging said track; and a mounting for said head comprising, a support, means universally connecting said support to said frame for movement up, down, and angularly in horizontal and vertical planes, a leaf spring attached at one end to said support and at the other end to said head, and a reinforcing spring attached to said support and engaging said head and leaf spring at a single point so as to provide reinforcement without resisting the movement of said head as it follows irregularities in said track.

7. A paging machine comprising, a frame, a circular turntable rotatably mounted on said frame, means forming two concentric circular magnetic tracks in said turntable and having magnetic signals recorded thereon, a magnetic recording and reproducing head associated with each of said tracks, means for selectively shifting said heads respectively into and out of engagement with said tracks to reproduce the signals on alternate tracks, each of said heads being mounted on a movable arm, said shifting means comprising an element movable to a first position where it engages one of said arms to lift its associated head away from its track while lowering the other arm to drop its associated head on its track, and to a second position where the position of said arms and associated heads is reversed.

References Cited in the file of this patent

UNITED STATES PATENTS

| | | |
|---|---|---|
| 890,195 | Stuart | June 9, 1908 |
| 897,765 | Morin | Sept. 1, 1908 |
| 900,392 | Kirkgaard | Oct. 6, 1908 |
| 1,828,189 | Kiliani | Oct. 20, 1931 |
| 2,144,844 | Hickman | Jan. 24, 1939 |
| 2,509,012 | Morrison | May 23, 1950 |
| 2,538,892 | Begun | Jan. 23, 1951 |
| 2,668,718 | Roberts | Feb. 9, 1954 |
| 2,673,249 | Ericsson | Mar. 23, 1954 |